United States Patent [19]

Gassman

[11] 4,095,543

[45] Jun. 20, 1978

[54] DUAL EXTRUSION WELT

[75] Inventor: Manuel B. Gassman, Swampscott, Mass.

[73] Assignee: Maynard Plastics, Inc., Salem, Mass.

[21] Appl. No.: 772,635

[22] Filed: Feb. 28, 1977

[51] Int. Cl.[2] .............................................. B32B 7/08

[52] U.S. Cl. .............................................. 112/417

[58] Field of Search ............... 112/417, 418, 424, 419; 428/123, 292

[56] References Cited

U.S. PATENT DOCUMENTS

| | | | |
|---|---|---|---|
| 1,748,094 | 2/1930 | Wolfson et al. | 112/417 |
| 2,214,794 | 9/1940 | LeCoq | 2/243 B X |
| 2,659,421 | 11/1953 | Wass et al. | 112/417 X |
| 3,028,641 | 4/1962 | Hendrie | 112/424 X |
| 3,665,880 | 5/1972 | Ambrose | 112/417 |

*Primary Examiner*—Alfred R. Guest
*Attorney, Agent, or Firm*—Wolf, Greenfield & Sacks

[57] ABSTRACT

Decorative plastic welt has an elongated, decorative, arcuate, bead portion formed of a first plastic material. An integral elongated plastic flange extends from said bead along its length to an outer flange edge and defines a first flange portion adjacent the bead and a second integral flange portion extending from the first portion to the flange edge. The second portion is an elongated see-through plastic strip which permits the flange to be aligned with sheet materials on either side so that positioning notches in the sheet materials can be matched by visual observation through the strip.

5 Claims, 5 Drawing Figures

DUAL EXTRUSION WELT

BACKGROUND OF THE INVENTION

Decorative welts, or seaming lace as it is sometimes called, formed of plastic strip material is used extensively in forming decorative edges of upholstery, car panel trims and the like. The welts are often used at the joining edges of two panels to provide an embossed or decorative bead surface giving a finished appearance as when a gusset and panel are stitched together with the welt therebetween.

Conventional welts comprise an elongated bead portion which may or may not be reinforced and which has a flange extension which is actually sewed between a panel and gusset. The flange extension is provided with inverted V-shaped notches at predetermined intervals. The V-shaped notches permit a sewing machine operator to see through the welt flange at appropriate intervals matched to intervals in V-shaped positioning notches of a gusset and panel with which the welt is used. These notches are alignment means. The notches can be stamped in any pattern so long as the same pattern is used in both the panel and gusset. Thus when two parts are to be stitched together the sewing machine operator simply matches the notches at the beginning and during the stitching operation and the two pieces are thus perfectly matched when sewn. In this type of sewing operation, notches must be formed in the welting aligned with the notches in the panel and gusset. A suitably formed welt is first stitched to either the panel or the gusset and then that piece is stitched to the other. For example, if the welt is stitched to the panel, that piece is then stitched to the gusset. The welting must of course be provided with corresponding notches so that the operator can see through the flange and match the exact patterns of the gusset and panel which are then stitched carefully so that the notches line up.

A problem arises in forming notch patterns in the welt which conform to the notch patterns in alignment in the gusset and panels. In some cases the notches in the gusset and panels may vary for different items and particularly designed welts must be used with particularly designed notch patterns. Even when the notch pattern of the gusset and panel are known at the time of manufacture of the welt, it is difficult to form properly positioned notches. The welt is often an extruded material which has some stretch to it. Forming an exact notch pattern in an extruded welt which stretches to some extent during extrusion is difficult. Such difficulties are compounded by the fact that continuous lengths of welt are formed during extrusion and the stretching of the notching pattern can become cumulative.

SUMMARY OF THE INVENTION

It is an object of this invention to provide a decorative plastic welt which has a see-through portion and facilitates ease of use in normal sewing operations.

Another object of this invention is to provide a decorative plastic welt in accordance with the preceding object wherein said see-through portion is of a soft material integral with other portions of the welt and which provides ease of bending and manipulating of the welt in normal sewing operations.

Still another object of this invention is to provide a method of sewing together a gusset and panel with a see-through welt portion therebetween.

According to the invention a decorative, plastic welt has an elongated axially extending, arcuate, decorative bead portion formed of a first plastic material. An integral, elongated plastic flange extends from said bead to an outer flange edge and defines a first flange portion adjacent the bead and axially extending therewith and a second integral flange portion extending from the first portion to the flange edge. The second portion forms an elongated see-through plastic strip which permits sewing of aligned sheet material portions on either side of and through the flange.

Preferably the strip is provided with means for enhancing ease of sewing. The means can comprise parallel slits extending at intervals along the flange which facilitates sewing around corners. Additionally or in place thereof, it is preferred that the second portion be made of a soft material which further facilitates bending and handling of the strip. Often the second portion of the integral plastic strip can have a Durometer value 10 or more units below the Durometer of the plastic first portion and bead.

It is a feature of this invention that positioning notches need not be used as when opaque plastic welts are formed. Particular color, surface effects and the like can appear in the bead portion and first flange portion if desired, while the second portion is transparent so that a user can see through to align gusset and panel notches or other sheet material indices used for positioning.

BRIEF DESCRIPTION OF THE DRAWINGS

The above and other features, objects and advantages of the present invention will be better understood from the following specification when read in conjunction with the accompanying drawings in which.

DESCRIPTION OF PREFERRED EMBODIMENTS

Figure 2:
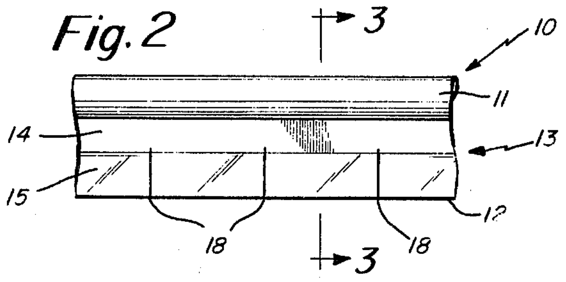
PRIOR ART Fig. 2
FIG. 2 is a side view of a decorative welt in accordance with the preferred embodiment of this invention.

With reference now to the drawings and more particularly FIG. 2, a preferred embodiment of a welt is illustrated generally at 10 and comprises an elongated arcuate, plastic, decorative bead portion 11 integrally joined to a flange 13 extending from the bead to an outer flange edge 12 with the flange 13 having a first flange portion 14 adjacent and axially aligned with the bead and a second flange portion 15 extending from the first portion to the flange edge with the second portion being formed of an elongated see-through plastic strip. The decorative bead 11 can be hollow or as in the preferred embodiment filled with a reinforcement 16.

Figure 3:
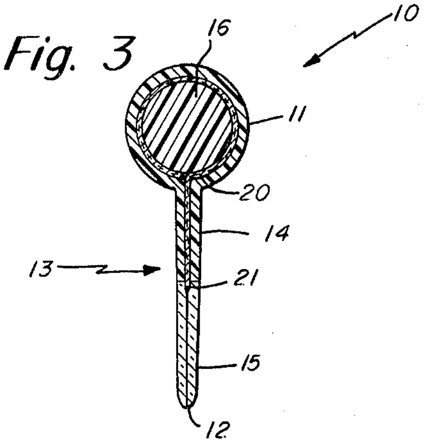
FIG. 3 is a cross sectional view through line 3—3 thereof.
Figure 4:
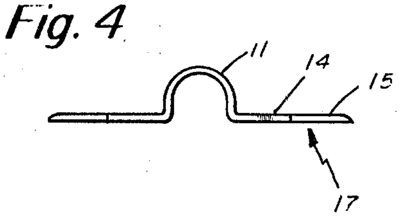
FIG. 4 is an end view of the welt in its extruded position.

Preferably the welt is formed as a coextrusion by known coextrusion techniques to form an intimate body as best illustrated at 17 in FIG. 4 having the see-through plastic portion or strip 15 coextruded with and integrally attached to portion 14 and the bead 11. The welt is formed in a known manner from the coextruded strip 17 into the shape shown in FIGS. 2 and 3 by gluing, heat sealing or otherwise adhering the flange portions to each other. In some cases the welt need not have its flange halves attached although this is preferred. In other cases sewing stitches can be used to attach the flange portion.

The body 17 is integrally formed of a single plastic material with the portion 11 and preferably 14 formed of an opaque material of a desired color which may have a textured or other embossed surface as desired. The integral portion 15 is preferably formed of a transparent plastic. The plastic can be the same or a compatible plastic to the plastic of portions 11 and 14.

For example, conventional thermoplastic materials can be used to form the welt body 17. Such thermoplastic materials include polyethylene, polyvinyl acetate, polyvinyl chloride and the like.

In the preferred embodiment, the coextruded portion 15 preferably has a Durometer at least 10 units below the Durometer value of portions 11 and 14 to enhance softness and thus enhance ease of sewing as will be described. This may be carried out for example by using a polyvinyl chloride body 11 and 14 of a red or other opaque colored material having a Durometer of 85, coextruded to be integral with portion 15 of transparent polyvinyl chloride having a Durometer value of 75.

Decorative welts in accordance with this invention preferably have flange thicknesses of from 0.01 inch to 0.080 inches as is the preferred range of thickness for the bead portion. The width of each flange from the bead to the flange edge is preferably in the range of from 3/16 inch to 2 inches with the diameter of the bead portion which may be filled with a reinforcement preferably lying in the range of from 0.093 inch to 0.350 inch. Preferably the Durometer of the portions 11 and 14 is in the range of from 75 to 95 Shore A scale, ASTM with the strip portion 15 having a durometer of from 60 to 95 Shore A, ASTM, and preferably at least 10 units lower than the Durometer of the portions 11, 14 on the Shore A scale.

Preferably slits 18 are provided at ½ inch lengths as best shown in FIG. 2. The slits aid in ease of bending the welt in normal sewing operations.

The reinforcement 16 in the preferred embodiment is an elongated rod of polypropylene wrapped with a strip of polyester cloth 20. The polyester cloth strip 20 extends around the rod 16 and down to line 21. This cloth gives substantial tear resistance to prevent the bead from being torn from the flange in normal usage. Any conventional reinforcement can be used as known in the art. In some cases, cloth or other sheet material reinforcement can be used without the rod or alternately the rod can be used alone to reinforce the bead 11. The reinforcement can be heat sealed or otherwise adhered to the inner surface of the body or in some cases can be held therein by frictional engagement alone.

Figure 1:
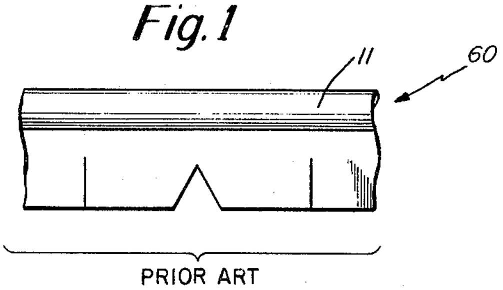
FIG. 1 is a side view of a prior art welt.

FIG. 1 illustrates a prior art welt 60 that is identical to the welt 10 except that it is formed entirely of an opaque plastic and has inverted V-shaped notches in its lower flange. As discussed above, the V-shaped notches are necessary in an opaque flange welt in order to enable one to align a gusset and panel with the welt therebetween and perform the sewing operation. However, these V-shaped notches and the inherent problems associated therewith are eliminated in the welt 10 of this invention.

Figure 5:
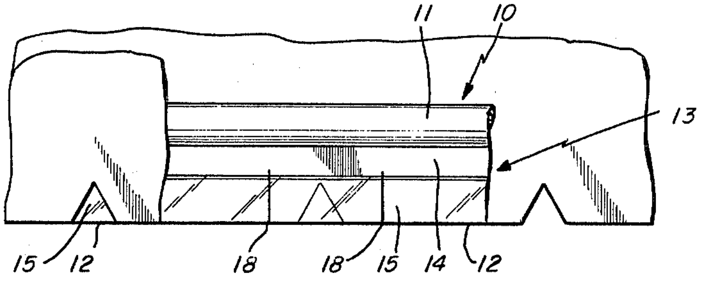
FIG. 5 is a schematic illustration of a method of sewing the welt in a conventional sewing operation.

As best seen in FIG. 5, the welt 10 can be used by placing it over the V-shaped notch edge of a gusset panel as shown. Note that the V-shaped notches of the panel show through the transparent flange portion of the welt 10. Thus an operator can place a second panel to be aligned with the gusset with its notches in alignment with the gusset notches which are easily seen through the flange portion 15. After placement as shown in FIG. 5, a line of stitching through the panel, gusset and sandwiched welt flange attaches the materials together in correct alignment.

While a specific welt of this invention has been described, many variations are possible within the scope of the invention. For example, in some cases the entire flange portion 13 can be transparent with only the bead portion opaque. While a welt of a specific configuration has been shown and described, other conventional configurations can be used. The welt need not be extruded as in FIG. 4 and then folded to its final shape. Thus the welt can be extruded by a coextrusion technique directly in its final form as for example the form of FIG. 3. While it is preferred that the flange portion 15 be softer than portion 14 to enhance ease of bending, portions 14 and 15 can be of the same Durometer and/or made of identical plastic with the only difference being an additive to make portion 11 and/or 14 opaque. It is important to be able to provide a decorative colored effect to the bead portion while still providing for ease of sewing and proper locating of panel and gusset members without the need for unwanted notches in the flange portion of welts.

I claim:

1. A decorative plastic welt comprising an elongated, decorative, arcuate bead portion formed of a first plastic material, an integral elongated plastic flange extending from said bead to an outer flange edge and defining a first flange portion adjacent said bead and a second flange portion extending from said first portion to said flange edge, said bead and flange being coextruded and said bead portion being opaque, said section portion forming an elongated see-through plastic strip which permits sewing of aligned sheet material portions on either side thereof.

2. A decorative plastic welt in accordance with claim 1 wherein said bead portion carries a reinforcement rod.

3. A decorative plastic welt comprising an elongated, decorative, arcuate bead portion formed of a first plastic material, an integral elongated plastic flange extending from said bead to an outer flange edge and defining a first flange portion adjacent said bead and a second flange portion integrally formed with and extending from said first portion to said flange edge, said first and second portions comprising different Durometer plastic materials with the plastic of said second portion having a Durometer of from 60 to 85 Shore A ASTM and said first portion having a Durometer of from 75 to 95 Shore A ASTM and said second portion having a Durometer at least 10 units lower than the Durometer of said first portion, said second portion forming an elongated see-through plastic strip which permits sewing of aligned sheet material portions on either side thereof.

4. A decorative plastic welt comprising an elongated, decorative, arcuate bead portion formed of a first plastic material, an integral elongated plastic flange extending from said bead to an outer flange edge and defining a first flange portion adjacent said bead and a second flange portion integrally formed with and extending from said first portion to said flange edge, said bead portion and said first portion being of an opaque plastic material and are coextruded with said second portion of a transparent plastic material, said second portion forming an elongated see-through plastic strip which permits sewing of aligned sheet material portions on either side thereof.

5. A decorative plastic welt comprising an elongated, decorative, arcuate bead portion formed of a first plastic material, an integral elongated plastic flange extending from said bead to an outer flange edge and defining a first flange portion adjacent said bead and a second flange portion extending from said first portion to said flange edge, said second portion defining an elongated mounting strip, said first and second portions comprising different Durometer plastic materials with the plastic of the second portion having a Durometer of from 60 to 85 Shore A ASTM throughout and said first portion having a Durometer of from 75 to 95 Shore A ASTM throughout and said second portion having a Durometer at least 10 units lower than the Durometer of said first portion.

* * * * *